US009813490B2

(12) United States Patent
Idicula et al.

(10) Patent No.: US 9,813,490 B2
(45) Date of Patent: Nov. 7, 2017

(54) SCHEDULED NETWORK COMMUNICATION FOR EFFICIENT RE-PARTITIONING OF DATA

(71) Applicant: Oracle International Corporation, Redwood Shores, CA (US)

(72) Inventors: Sam Idicula, Santa Clara, CA (US); Aarti Basant, Santa Clara, CA (US); Vikas Aggarwal, Redwood City, CA (US); Stephan Wolf, Zurich (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 120 days.

(21) Appl. No.: 14/711,617

(22) Filed: May 13, 2015

(65) Prior Publication Data

US 2016/0337442 A1 Nov. 17, 2016

(51) Int. Cl.
*G06F 15/16* (2006.01)
*H04L 29/08* (2006.01)
(Continued)

(52) U.S. Cl.
CPC ........ *H04L 67/10* (2013.01); *G06F 17/30545* (2013.01); *G06F 17/30584* (2013.01); *H04L 12/40143* (2013.01); *H04L 47/828* (2013.01)

(58) Field of Classification Search
CPC . H04L 67/10; H04L 12/40143; H04L 47/828; G06F 17/30584; G06F 17/30545
(Continued)

(56) References Cited

U.S. PATENT DOCUMENTS

2004/0215805 A1* 10/2004 Tan .................. H04L 29/06027
709/231
2009/0154481 A1* 6/2009 Han ....................... H04L 12/66
370/406

FOREIGN PATENT DOCUMENTS

EP 1 130 872 A1 9/2001

OTHER PUBLICATIONS

Zahavi, Eitan, "Optimized InfiniBand Fat-Tree Routing for Shift All-to-All Communication Patterns", Concurrency and Computation: Practice and Experience, dated 2009, 15 pages.
(Continued)

*Primary Examiner* — Frantz Jean
(74) *Attorney, Agent, or Firm* — Hickman Palermo Becker Bingham LLP (57) ABSTRACT

A method, apparatus, and system for efficiently re-partitioning data using scheduled network communication are provided. Given re-partitioning data defining the data blocks to be sent amongst a plurality of server nodes, a corresponding network schedule is determined to send the data blocks in a coordinated manner. The network schedule is divided into time slots, wherein each of the plurality of server nodes can send up to one data block and receive up to one data block in each time slot. By using a greedy selection algorithm that prioritizes by largest senders and largest receivers, a near optimal schedule can be determined even in the presence of heavy skew. The greedy selection algorithm can be implemented with a O(T*N^2) time complexity, enabling scaling to large multi-node clusters with many server nodes. The network schedule is of particular interest for database execution plans requiring re-partitioning on operators with different keys.

20 Claims, 6 Drawing Sheets (51) Int. Cl.
    *H04L 12/40*    (2006.01)
    *G06F 17/30*    (2006.01)
    *H04L 12/911*   (2013.01)

(58) Field of Classification Search
    USPC .......................................................... 709/218
    See application file for complete search history.

(56) References Cited

OTHER PUBLICATIONS

Zahavi, Eitan, "Fat-TreeRouting and Node Ordering Providing Contention Free Traffic for MPI Global Collectives", dated 2012, 10 pages.
Perry et al, Fastpass: A Centralized "Zero-Queue", Datacenter Network, SIGCOMM, dated Aug. 2014, 12 pages.
Novakovic et al., "Scale-Out Numa", In Proceedings of ASPLOS-XIX, dated Mar. 2014, 15 pages.
Long et al., "Longest-queue-first scheduling under SINR interference model", ACM, dated Sep. 20, 2010, 10 pages.
Anonymous:, "Time Division Multiple Access Wikipedia, the free encyclopedia", from the internet https://web.archive.org/web/20150509120053, dated Sep. 7, 2016, 4 pages.
Alan R Hevner et al., "Query Processing in Distributed Database System", dated May 1, 1979, from the internet, http://ieexplore,ieee.org.ielx5/32/35910/01702617, 12 pages.
Wolf Rödiger et al., "Locality-Sensitive Operators for Parallel Main-Memory Database Clusters" In Proceedings of the IEEE International Conference on Data Engineering (ICDE '14). 2014, 12 pages.
S. Novakovic, A. Daglis et al., "Scale-Out NUMA". In 19th International Conference on Architectural Support for Programming Languages and Operating Systems (ASPLOS), 2014, 15 pages.
Mohammad Al-Fares et al., "Hedera: Dynamic Flow Scheduling for Data Center Networks", In Proceedings of the 7th USENIX conference on Networked Systems Design and Implementation Apr. 2010, 15 pages.
EG Gran, SA Reinemo. "InfinBand congestion control: modelling and validation", In Proceedings of the 4th International ICST Conference on Simulation Tools and Techniques(ICST), 2011, 8 pages.
Palur et al., "Understanding Torus Network Performance through Simulations", dated 2014, 2 pages.

* cited by examiner

Receivers

| Senders | Node 110A | Node 110B | Node 110C | Node 110D |
|---|---|---|---|---|
| Node 110A |   | 3 | 3 | 3 |
| Node 110B | 2 |   | 3 | 2 |
| Node 110C | 2 | 3 |   | 3 |
| Node 110D | 2 | 1 | 2 |   |

| Time | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Node 110A | B | B | B | C | C | C | D | D | D |   |   |   |   |   |
| Node 110B | A |   |   |   | A | C | C | C | D |   | D |   |   |   |
| Node 110C |   | A |   | A | D | D | B |   |   | D | B | B |   |   |
| Node 110D |   |   | A |   | A |   |   |   |   | C | C |   |   | B |

| Time | 0 | 1 | 2 | 3 | 4 | 5 | 6 | 7 | 8 |
|---|---|---|---|---|---|---|---|---|---|
| Node 110A | B | B | B | C | C | C | D | D | D |
| Node 110B | A | A | C | D | D |   | C | C |   |
| Node 110C | D | D | D | B | B | B | A | A |   |
| Node 110D | C | C | A | A |   | B |   |   |   |

| Time | 0 | 1 | 2 | 3 | 4 | 5 | 6 | 7 | 8 | 9 |
|---|---|---|---|---|---|---|---|---|---|---|
| Node 110A | B | B | B | C | C | C | D | D | D |   |
| Node 110B | C | C | C | A | A | D |   |   | D |   |
| Node 110C | A | A | D | D | D | B | B | B |   |   |
| Node 110D |   |   | A | B |   | A | C | C |   |   |

FIG. 2A

202
RECEIVE RE-PARTITIONING DATA DESCRIBING, FOR EACH OF A PLURALITY OF SERVER NODES, A QUANTITY OF DATA BLOCKS TO BE SENT TO EACH OF THE PLURALITY OF SERVER NODES

204
DETERMINE A SENDER ORDER FOR THE PLURALITY OF SERVER NODES BY USING THE RE-PARTITIONING DATA TO SORT, IN DESCENDING ORDER, THE PLURALITY OF SERVER NODES BY A TOTAL QUANTITY OF DATA BLOCKS TO BE SENT

206
POPULATE, IN THE SENDER ORDER, A NETWORK SCHEDULE COMPRISING A PLURALITY OF TIME SLOTS, WHEREIN EACH OF THE PLURALITY OF TIME SLOTS SPECIFIES, FOR EACH OF THE PLURALITY OF SERVER NODES AS A SENDER NODE, AT MOST ONE RECEIVER NODE, OF THE PLURALITY OF SERVER NODES, TO SEND A DATA BLOCK OVER A NETWORK, WHEREIN EACH OF THE PLURALITY OF TIME SLOTS SPECIFIES A PARTICULAR NODE NO MORE THAN ONCE, AND WHEREIN THE AT MOST ONE RECEIVER NODE IS SPECIFIED BASED AT LEAST ON HAVING A LARGEST POSSIBLE QUANTITY OF DATA BLOCKS TO BE RECEIVED BY THE SENDER NODE ACCORDING TO THE RE-PARTITIONING DATA

208
CAUSE THE PLURALITY OF SERVER NODES TO RE-PARTITION ACCORDING TO THE NETWORK SCHEDULE

| Time | 0 | 1 | 2 | 3 | 4 | 5 | 6 | 7 | 8 | 9 |
|---|---|---|---|---|---|---|---|---|---|---|
| Node 110A | B | B | B | C | C | C | D | D | D | |
| Node 110B | | | | | | | | | | |
| Node 110C | | | | | | | | | | |
| Node 110D | | | | | | | | | | |

234B

| Time | 0 | 1 | 2 | 3 | 4 | 5 | 6 | 7 | 8 | 9 |
|---|---|---|---|---|---|---|---|---|---|---|
| Node 110A | B | B | B | C | C | C | D | D | D | |
| Node 110B | | | | | | | | | | |
| Node 110C | D | D | D | B | B | B | A | A | | |
| Node 110D | | | | | | | | | | |

234C

| Time | 0 | 1 | 2 | 3 | 4 | 5 | 6 | 7 | 8 | 9 |
|---|---|---|---|---|---|---|---|---|---|---|
| Node 110A | B | B | B | C | C | C | D | D | D | |
| Node 110B | C | C | C | A | A | D | | | | D |
| Node 110C | A | A | D | D | D | B | B | B | | |
| Node 110D | | | | | | | | | | |

234D

| Time | 0 | 1 | 2 | 3 | 4 | 5 | 6 | 7 | 8 | 9 |
|---|---|---|---|---|---|---|---|---|---|---|
| Node 110A | B | B | B | C | C | C | D | D | D | |
| Node 110B | C | C | C | A | A | D | | | | D |
| Node 110C | A | A | D | D | D | B | B | B | | |
| Node 110D | | | A | B | | A | C | C | | |

FIG. 3

SCHEDULED NETWORK COMMUNICATION FOR EFFICIENT RE-PARTITIONING OF DATA

FIELD OF THE INVENTION

The present disclosure relates to network communications, and more specifically, to determining a network schedule for efficient re-partitioning of data.

BACKGROUND

When evaluating analytic queries in a distributed multi-node system, the need to re-distribute or re-partition the data often arises. For example, in the context of a database system, analytic queries that require join and aggregation operations on different keys will benefit from a re-partitioning of the data to optimally process each operation on the different keys. Additionally, if a data distribution for a particular operator becomes heavily skewed towards certain nodes, then performance can be improved by re-partitioning the data to re-balance the workload across the multi-node system.

While the re-partitioning allows the data to be more efficiently processed in the distributed multi-node system, the re-partitioning itself adds processing overhead since significant amounts of data needs to be exchanged between nodes in a many-to-many fashion. The complexity of the re-partitioning also increases as the number of nodes increases. A non-blocking, high bandwidth interconnect such as InfiniBand can be used to accelerate the re-partitioning. However, even with the use of an appropriate high-speed interconnect, the re-partitioning may still comprise 50-60% of the overall query execution time.

Based on the foregoing, there is a need for a method to optimize data re-partitioning in a distributed multi-node system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, an improved method for efficiently re-partitioning data using scheduled network communication is provided. Given re-partitioning data defining the data blocks to be sent amongst a plurality of server nodes, a corresponding network schedule is determined to send the data blocks in a coordinated manner. The network schedule is divided into time slots, wherein each of the plurality of server nodes can send up to one data block and receive up to one data block in each time slot.

By using a greedy selection algorithm that prioritizes first by the sender node with the largest number of data blocks to send and prioritizes second by the largest receiver node with the largest number of data blocks to receive, a near optimal schedule can be determined. Moreover, by prioritizing the nodes with the largest amount of data to send or receive, the greedy selection algorithm is particularly suited for re-partitioning that is heavily skewed to particular nodes. Minimal computational overhead is incurred by implementing the greedy selection algorithm using sorted lists that are maintained for senders and receivers. After the network schedule is determined, the data re-partitioning can proceed according to the network schedule.

This improved approach for re-partitioning data using a near optimal network schedule can significantly reduce the time required to accomplish re-partitioning. Additionally, the greedy selection algorithm can be implemented with a time complexity of $O(T*N^2)$, wherein T is the total number of time slots for the network schedule and N is the number of communicating nodes, as compared to optimal solutions that run in $O(T*N^4)$ time. Accordingly, this approach has particular relevance for scaling to large multi-node clusters with many server nodes.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data Manipulation Language ("DML") statements are SQL statements that retrieve or manipulate data in tables. DML statements are the most frequently used SQL statements. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

Figure 1A:
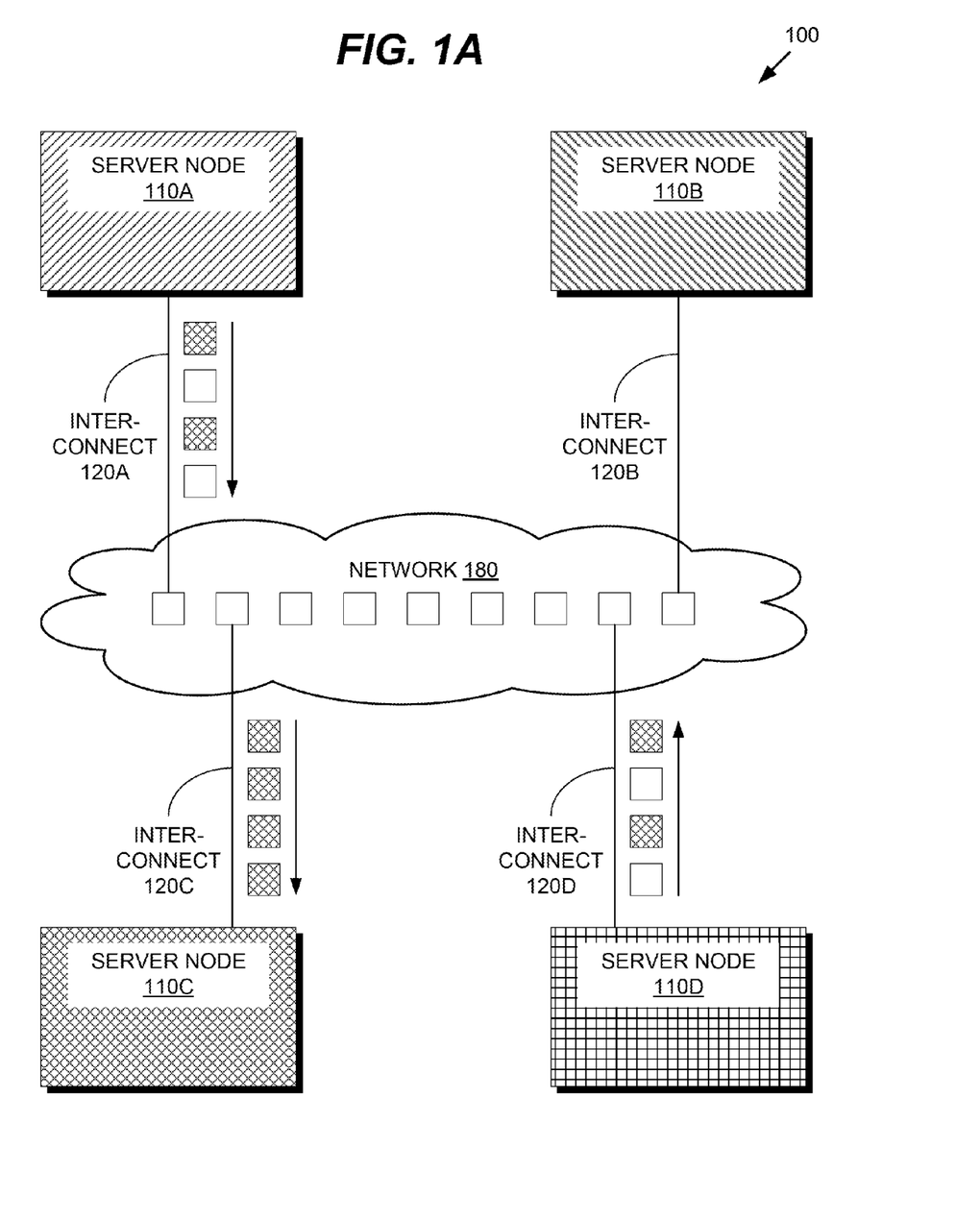
FIG. 1A is a block diagram that depicts an example system for data re-partitioning between a plurality of server nodes.

FIG. 1A is a block diagram that depicts an example system for data re-partitioning between a plurality of server nodes. System 100 of FIG. 1A includes server node 110A, server node 110B, server node 110C, server node 110D, interconnect 120A, interconnect 120B, interconnect 120C, interconnect 120D, and network 180.

To support data intensive applications with large numbers of records and transactions, a multi-node database system may be implemented using server nodes 110A-110D in FIG. 1A. For certain database operations such as table joins and aggregation, it may be efficient to re-partition data workloads amongst the multiple server nodes for parallel processing, for example by assigning nodes to process certain key ranges based on a key used by the database operation. For each re-partitioning, significant amounts of data may need to be exchanged over network 180 between server nodes 110A-110D.

Before describing the re-partitioning process in detail, it may be helpful to first establish the concept of a "time slot" as used in this application. Each schedule may be defined in terms of sequential time slots. A time slot defines a period of time wherein each server node can send or receive up to a set amount of data from a network. This set amount of data is referred to as a data block; the data block size may be set according to application, hardware, or network specifications. Accordingly, the length of each time slot may depend on the chosen data block size and the performance characteristics of network 180, which may be a high speed fabric such as Infiniband, a high-speed Ethernet network, or another suitable high-speed network.

Figure 1B:
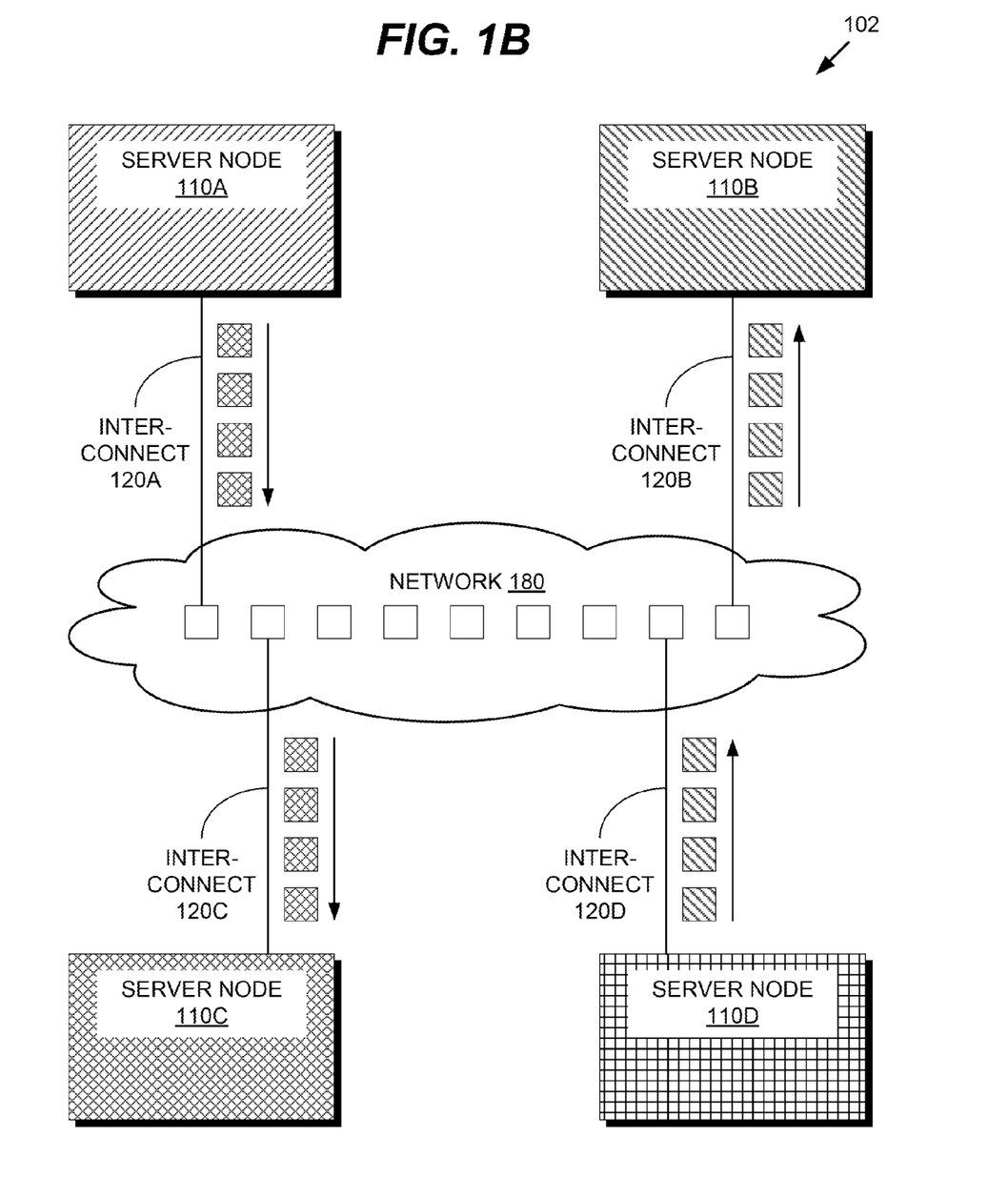
FIG. 1B is a block diagram that depicts an example system for data re-partitioning between a plurality of server nodes, according to an embodiment.

The examples shown in FIG. 1A and FIG. 1B are for illustrative purposes, and thus each server node 110A-110D can only send OR receive at most one data block over network 180 within a single time slot. However, in other embodiments, each server node may send at most one data block AND receive at most one data block within a single time slot. Thus, a server node may concurrently send a data block over a network and receive a different data block over the same network within the same time slot.

In an embodiment, system 100 may be used in the context of databases. However, system 100 is not necessarily limited to database contexts and may correspond to any application or service that requires data re-partitioning for parallel processing over multiple nodes. In the context of databases, server nodes 110A-110D may correspond to a multi-node database management system.

When system 100 receives a database query from an application, system 100 may form a query execution plan to carry out the SELECT query that retrieves the requested database records from a database. As part of the query execution plan, operators with parallelizable workloads may distribute the workload amongst server nodes 110A-110D for parallel processing. However, if subsequent operators in the query plan operate on different keys, then the workload data will need to be re-partitioned according to the new key on the later operator. As part of this re-partitioning, server node 110A may need to send data to server nodes 110B, 110C, and 110D, server node 110B may need to send data to server nodes 110A, 110C, and 110D, server node 110C may need to send data to server nodes 110A, 110B, and 110D, and server node 110D may need to send data to server nodes 110A, 110B, 110C. In other words, server nodes 110A-110D will need to exchange data amongst themselves in a many-to-many fashion.

Unscheduled Re-Partitioning

FIG. 1A demonstrates the inefficiencies that may result if network 180 is utilized in an uncoordinated fashion without a network schedule. The data transfer illustrated in FIG. 1A may occur over four (4) sequential time slots. For example, as part of the re-partitioning, both server node 110A and server node 110D may need to send data to server node 110C. If both server node 110A and server node 110D attempt to send data blocks to server node 110C at the same time, the sending nodes will be limited by the maximum bandwidth of the receiving node. Thus, while server node 110C receives data blocks from interconnect 120C at full bandwidth (4 data blocks for 4 time slots), server nodes 110A-110B only send data blocks via respective interconnects 120A-120B at half bandwidth (2 data blocks for 4 time slots). Additionally, interconnect 120B for server node 110B is not utilized at all (0 data blocks for 4 time slots). Thus, network 180 is not utilized to its full bandwidth potential.

Scheduled Re-Partitioning

To improve the utilization of network 180 and thereby accomplish the re-partitioning in less time, a network schedule may be utilized. FIG. 1B shows an example where a network schedule is used to coordinate the data exchange between the server nodes. FIG. 1B is a block diagram that depicts an example system for data re-partitioning between a plurality of server nodes, according to an embodiment. System 102 of FIG. 1B includes server node 110A, server node 110B, server node 110C, server node 110D, interconnect 120A, interconnect 120B, interconnect 120C, interconnect 120D, and network 180.

As shown in FIG. 1B, the transfers between server nodes 110A-110D have been coordinated to optimize the usage of network 180. Thus, rather than having server nodes 110A and 110D attempting to send the data to server node 110C at the same time, the sending is staggered such that server node 110A sends its data blocks first to server node 110C, and then server node 110D sends its data blocks to server node 110C at a later time (not specifically shown in FIG. 1B). Accordingly, the full bandwidth of interconnect 120A and 120C is utilized with 4 data blocks sent and received in 4 time slots. Additionally, by scheduling server node 110D to send data blocks to server node 110B at the same time, the full bandwidth of interconnect 120D and 120B is also fully utilized with 4 data blocks sent and received in the same 4 time slots. Thus, by using a network schedule, network 180 of system 102 is utilized in an optimal manner compared to network 180 of system 100 in FIG. 1A, where no network schedule is utilized.

While the usage of network 180 is optimized in FIG. 1B compared to FIG. 1A, a network schedule must be available as a precondition for FIG. 1B to proceed. Generating the network schedule is a non-trivial task, particularly when a large number of nodes are involved. Thus, it may be instructive to review a few different approaches to generating a network schedule given re-partitioning data that defines the data blocks to be transferred over a network.

Re-Distribution Data Matrix

Figure 1C:
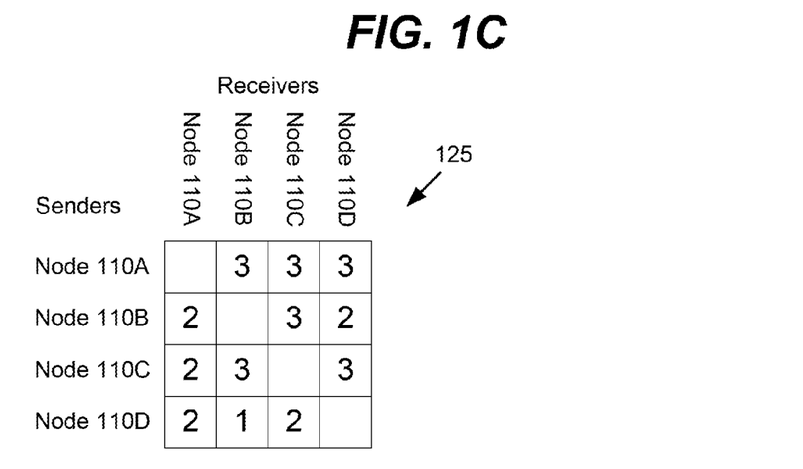
FIG. 1C is a block diagram that depicts a matrix representation of example re-partitioning data, according to an embodiment.

To examine re-partitioning data in more detail, FIG. 1C is a block diagram that depicts a matrix representation of example re-partitioning data, according to an embodiment. FIG. 1C includes re-partitioning data 125, shown in matrix form. Thus, re-partitioning data 125 indicates that server node 110A needs to send 3 data blocks to server node 110B, 3 data blocks to server node 110C, and 3 data blocks to server node 110D. Server node 110B needs to send 2 data blocks to server node 110A, 3 data blocks to server node 110C, and 2 data blocks to server node 110D. Server node 110C needs to send 2 data blocks to server node 110A, 3 data blocks to server node 110B, and 3 data blocks to server node 110D. Server node 110D needs to send 2 data blocks to server node 110A, 1 data block to server node 110B, and 2 data blocks to server node 110C.

While re-partitioning data 125 of FIG. 1C is depicted as only indicating the total number of blocks for each sender node to send to each receiver node, re-partitioning data 125 may also identify the specific data blocks that are to be sent for each matrix cell. Thus, for the example of a database operator, a new partitioning of the workload data can be determined after key ranges for the database operator are determined for each server node. Based on an existing partitioning of the workload data, the necessary network data transfers to transition to the new partitioning can be determined as re-partitioning data 125, with the data divided into data blocks of a set data block size.

Unscheduled, Optimal, and Greedy Heuristic Schedules

Figure 1D:
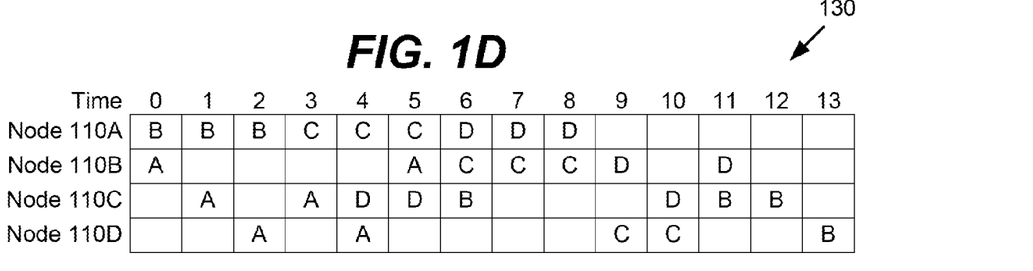
FIG. 1D, FIG. 1E and FIG. 1F are a block diagrams that depict example network schedules to re-partition data based on the re-partitioning data of FIG. 1C.
Figure 1E:
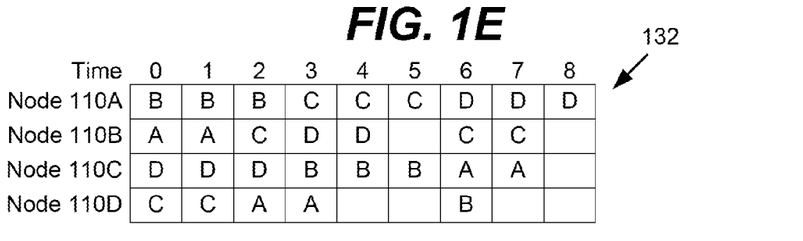
Figure 1F:
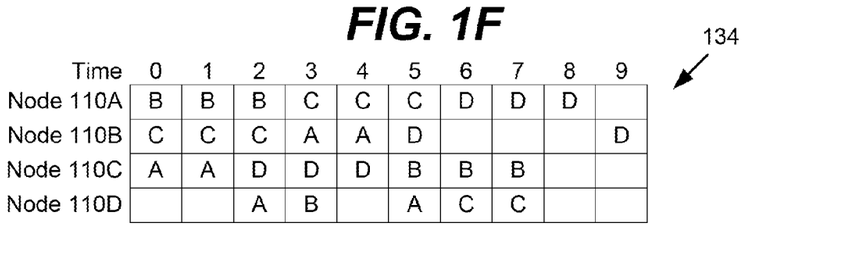

Now that re-partitioning data 125 is available, various network scheduling approaches can be compared using re-partitioning data 125 as example data. FIG. 1D, FIG. 1E and FIG. 1F are a block diagrams that depict example network schedules to re-partition data based on the re-partitioning data of FIG. 1C. As shown in network schedule 130 of FIG. 1D, the network schedule is a sequential list of time slots from time slot #0 to time slot #13. Each time slot (column) defines, for each server node as a sender node (row), at most one server node as a receiver node (cell). If no receiver node is specified in a cell, then no network data transfer occurs for that sender node in the associated time slot. Network schedule 132 and 134 of respective FIG. 1E and FIG. 1F are also structured in the same manner as network schedule 130 of FIG. 1D.

Network schedule 130 of FIG. 1D is based on an unscheduled approach. Thus, each server node is treated as equally important for sending data, regardless of the amount of data that needs to be transferred to each server node. Data is thus sent between nodes in an uncoordinated manner, causing network bottlenecks that force nodes to wait unproductively during time slots. Thus, a total of 14 time slots is required to finish network schedule 130.

Network schedule 132 of FIG. 1E is based on an optimized approach. Thus, re-partitioning data 125 is analyzed to create a network schedule 132 that requires the least amount of time slots to complete, or 9 time slots. While network schedule 132 completes the re-partitioning in much less time than network schedule 130, the time to generate network schedule 132 must also be taken into account when evaluating the two approaches. Since the solving of such a network schedule is not trivial and known algorithms have a complexity of $O(N^4)$ or worse, the optimized approach is only practical for very small N, or for systems with very few server nodes. Accordingly, the optimized approach fails to scale to large scale systems with many nodes.

Network schedule 134 of FIG. 1F is based on a heuristic greedy approach. To generate network schedule 134, the sending nodes (rows) with the largest number of data blocks to send are prioritized for populating first. When determining the receiver node (cell) for a given sending node (row), the receiver node with the largest number of data blocks to receive for that sending node is prioritized for selecting first. If that receiver node is already assigned to a different sender node in the same time slot (column), then the next receiver node with the largest number of data blocks to receive for that sending node is chosen. This is repeated until either a receiver node is chosen or until all the possible receiver nodes available are exhausted, in which case the cell is left empty and the sending node merely waits during that time slot. When a receiver node is chosen, it may be repeated to populate subsequent contiguous sequential time slots to coalesce the data blocks for the receiver node.

By prioritizing the sending nodes and receiving nodes with the largest amount of data to transfer, available network bandwidth is allocated in a heuristic, greedy manner to the nodes that require the most network resources. Thus, the heuristic greedy approach works especially well for skewed data re-partitioning, since the skewed nodes that need to send or receive large amounts of data are prioritized for servicing first. As shown in FIG. 1F, a total of 10 time slots is required for the heuristic greedy approach, providing a near optimal result when compared to the 9 time slots required by the optimal approach of FIG. 1E. However, because the heuristic greedy approach can be implemented by maintaining sorted lists of senders and receivers, the worst case time complexity is only $O(T*N^2)$, wherein T is the total number of time slots for the network schedule. Thus, scaling for large multi-node systems is provided. A process for building network schedule 134 is described in further detail in conjunction with FIG. 2A below.

Network Schedule Building Process

Figure 2A:
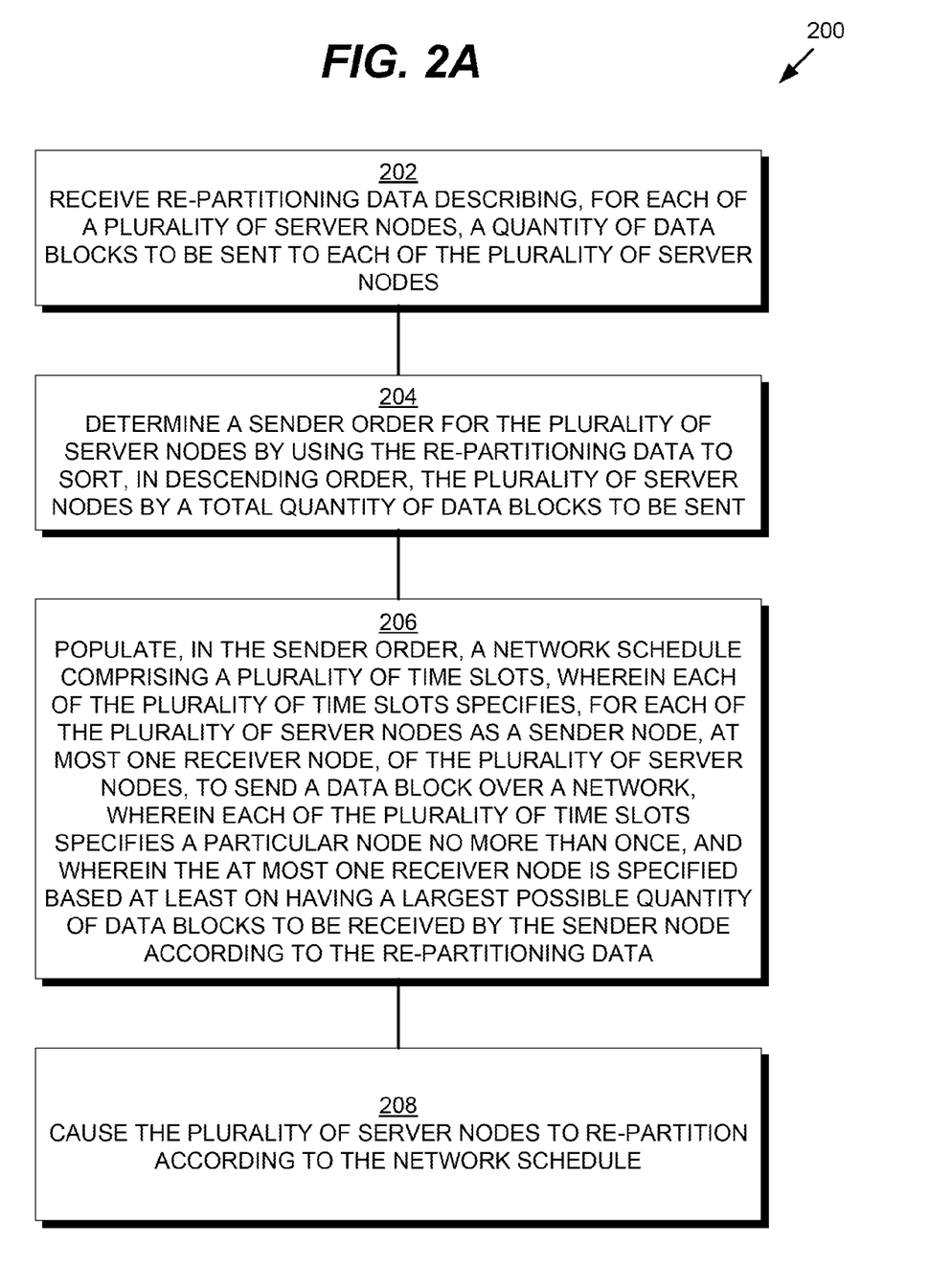
FIG. 2A is a block diagram that depicts a process for building a network schedule for efficient re-partitioning of data, according to an embodiment.

With a basic outline of system 100 and network schedule 134 now in place, it may be instructive to review a high level overview of the processing steps to build network schedule 134. Turning to FIG. 2A, FIG. 2A is a block diagram that depicts a process for building a network schedule for efficient re-partitioning of data, according to an embodiment.

Receiving the Re-Partitioning Data

At block 202 of process 200, referring to FIG. 1A and FIG. 1C, server node 110A receives re-partitioning data 125. In this particular example, server node 110A is arbitrarily chosen to carry out process 200. In certain embodiments, a specific server node from server nodes 110A-110D may be selected to carry out process 200. In other embodiments, a dedicated coordinator server (not shown in FIG. 1A) may be assigned to carry out process 200, wherein the coordinator server is separate from server nodes 110A-110D.

To receive re-partitioning data 125, information concerning presently available and required data blocks may first be gathered from each of server nodes 110A-110D. For example, in the context of executing a database execution plan, the presently available data blocks on server nodes 110A-110D may correspond to a workload division according to a first database operator using a first key, and the required data blocks on server nodes 110A-110D may correspond to a workload division according to a second subsequent database operator using a second key. After the information concerning the available and required data blocks is gathered and analyzed, re-partitioning data 125 may be received in matrix form, as shown in FIG. 2A. Thus, re-partitioning data 125 specifies, for each of the server nodes 110A-110D, a quantity of data blocks to be sent to each of the server nodes 110A-110D.

Determining a Sender Order

At block 204 of process 200, referring to FIG. 1A and FIG. 1C, server node 110A determines a sender order for server nodes 110A-110D by using re-partitioning data 125 to sort, in descending order, server nodes 110A-110D by a total quantity of data blocks to be sent. Given the example data shown in re-partitioning data 125 of FIG. 1C, the total quantity of data blocks to be sent by each server node can be readily determined by first summing each row:
Server node 110A—3+3+3=9 data blocks
Server node 110B—2+3+2=7 data blocks
Server node 110C—2+3+3=8 data blocks
Server node 110D—2+1+2=5 data blocks Next, by sorting in descending order of total quantity of data blocks to be sent, the sending order can be determined as follows:
1. Server node 110A (9 data blocks)
2. Server node 110C (8 data blocks)
3. Server node 110B (7 data blocks)
4. Server node 110D (5 data blocks)

Populating a Network Schedule

At block 206 of process 200, referring to FIG. 1A and FIG. 1F, server node 110A populates, in the sender order determined from block 204, network schedule 134. As shown in FIG. 1F, network schedule 134 includes 10 time slots numbered from 0 to 9. Since the total number of required time slots may be unknown until network schedule 134 is fully populated, a pre-determined number of time slots may be initially reserved and later trimmed once the total number of required time slots is known.

As shown in block 206, the building of network schedule 134 follows specific rules. First, network schedule 134 is populated in the sender order determined from block 204. In other words, the largest data senders are prioritized first. Thus, the entire row for server node 110A (sending 9 blocks) is populated first, then the entire row for server node 110C (sending 8 blocks) is populated second, then the entire row for server node 110B (sending 7 blocks) is populated third, and then the entire row for server node 110D (sending 5 blocks) is populated fourth.

Second, each time slot specifies, for each of the server nodes as sender nodes, at most one receiver node. This corresponds to the cells for a particular column (time slot). Each cell may be empty or may specify one receiver node for the corresponding sending node (row). For example, time slot #0 specifies that server node 110A sends a data block to server node 110B, server node 110B sends a data block to server node 110C, server node 110C sends a data block to server node 110A, and server node 110D does nothing (empty cell).

Third, each of the time slots specifies a particular node as a receiver node no more than once. For example, as shown in time slot #0 of network schedule 134, the cell for server node 110D is required to be empty since server nodes 110A, 110B, and 110C have already been specified in cells for server nodes 110A-110C. When this third rule is combined with the second rule above, each server node is limited to send at most one data block and to receive at most one data block within a single time slot. By enforcing these rules, network induced bottlenecks can be avoided when building network schedule 134.

Fourth, the at most one receiver node for each cell is specified based at least on having a largest possible quantity of data blocks to be received by the sender node, according to re-partitioning data 125. In other words, the largest data receivers are prioritized second. To enforce this rule, an ordered list of receivers may be created for each sender, maintained in descending order of data blocks to be received by the sender. To select a receiver for a particular sender and cell, the ordered list for the particular sender is traversed until a receiver is found that has not already been specified for a prior sender in the same time slot. A bitmask or similar structure may be maintained for each time slot to keep track of receivers that have already been specified, thereby ensuring that each of the time slots specifies a particular receiver no more than once. Note that the use of a bitmask enables a lookup against the receivers in O(1) time. If no suitable receiver is found in the traversal for a cell, then the cell is left empty.

Assuming a suitable receiver is specified for a cell, then the value (quantity of data blocks to be received) of the receiver in the ordered list is decremented. The specified receiver may be specified repeatedly to fill subsequent sequential time slots until the value of the specified receiver is decremented to 0 or until a time slot is reached wherein the specified receiver is already assigned to a previous sender. Thus, the at most one receiver node may also be specified based on coalescing, or populating the specified receiver into contiguous time slots. After the specified receiver cannot be specified for any more contiguous time slots, the ordered list of receivers is reordered if necessary, and the traversal of the ordered list restarts for the next cell to be populated. Since the ordered list is maintained in order, the reordering can be completed within O(log(N)) with a worst case of O(N).

Note that the above example prioritizes the largest senders first and prioritizes the largest receivers second. Thus, network schedule 134 is built in row or sender order. In alternative embodiments, the largest receivers may be prioritized first and the largest senders may be prioritized second. In this embodiment, network schedule 134 may be built in column or receiver order.

Example Populating

Figure 2B:
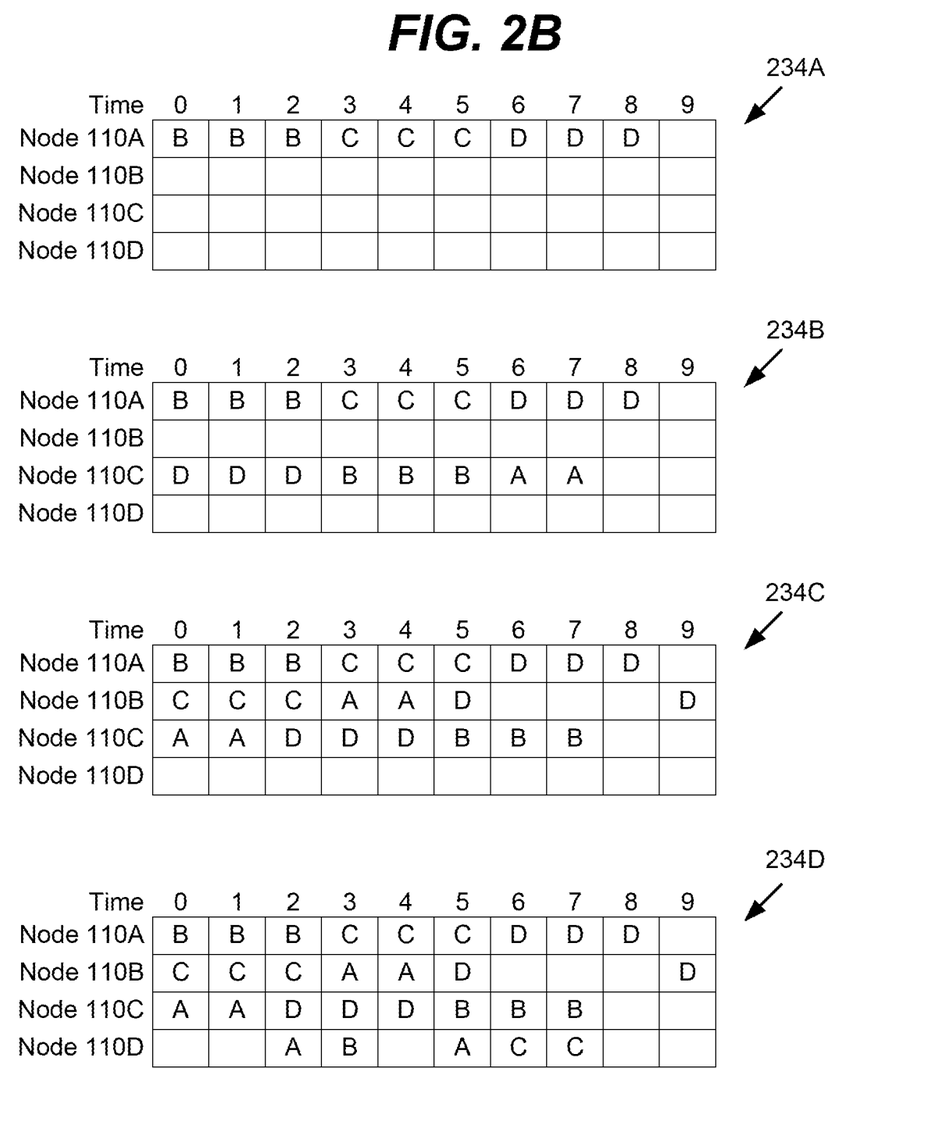
FIG. 2B is a block diagram that depicts a populating of the network schedule of FIG. 1F, according to an embodiment.

Having laid out the general rules for block 206, it may be helpful to observe these rules being applied to the example data shown in re-partitioning data 125. As discussed above for block 204, the entire row for server node 110A is populated first in network schedule 134. Since server node 110A needs to send 3 data blocks to each of server nodes 110B-110D, as indicated by re-partitioning data 125, the sending schedule for server node 110A be built as shown in FIG. 2B. Turning to FIG. 2B, FIG. 2B is a block diagram that depicts a populating of network schedule 134 from FIG. 1F, according to an embodiment. With respect to FIG. 2B, network schedule 234A, network schedule 234B, network schedule 234C, and network schedule 234D may correspond to network schedule 134 of FIG. 1F at different stages of completion.

First Sender

For server node 110A as the sending node, the ordered list of receivers is as follows:
1. Server node 110B (3 data blocks)
2. Server node 110C (3 data blocks)
3. Server node 110D (3 data blocks)

Since server node 110A is the first sender row to be populated, there are no prior rows in the same time slot that need to be considered when selecting a receiver. Thus, the ordered list of receivers can be processed in sequential order, as shown in network schedule 234A, with 3 data blocks sent to server node 110B within time slots 0-2, 3 data blocks sent to server node 110C within time slots 3-5, and 3 data blocks sent to server node 110D within time slots 6-8.

Second Sender

The next sending node to populate is determined by the sender order of block 204. Thus, server node 110C is populated next. For server node 110C as the sending node, the ordered list of receivers is as follows:

1. Server node 110B (3 data blocks)
2. Server node 110D (3 data blocks)
3. Server node 110A (2 data blocks)

Starting with time slot #0 for server node 110C in network schedule 234A, the ordered list of receivers is traversed to select a candidate receiver for the empty cell. Thus, entry 1 in the ordered list is selected, or server node 110B. Since server node 110B was already previously specified by server node 110A in time slot #0, the traversal continues to entry 2 in the ordered list, or server node 110D. Since server node 110D has not been previously specified in time slot #0, server node 110D is specified as the receiver for time slot #0, as shown in network schedule 234B.

As discussed above, a bitmask of available receivers for each time slot may be maintained to assist in determining whether a node was already previously specified. Thus, for time slot #0, the bitmask may correspond to 0100 to indicate that server node 110B is already specified. After server node 110C is populated with server node 110D as the receiving node for time slot #0, then the bitmask may be updated to 0101. The value of the selected receiver is also decremented in the ordered list. In some embodiments, the ordered list of receivers may directly reference the values in re-partitioning data 125. The ordered list of receivers is updated as follows:
1. Server node 110B (3 data blocks)
2. Server node 110D (2 data blocks)
3. Server node 110A (2 data blocks)

Recall that once a receiver is specified, it may continue to be specified for subsequent contiguous sequential time slots until the value of the receiver in the ordered list is decremented to 0 or until the receiver is already specified for a prior sender in a time slot. In the case of network schedule 234B, the selected receiver or server node 110D can be continued to be specified for time slot #1 and #2, thereby exhausting the value of the receiver by decrementing twice. Accordingly, the ordered list of receivers is updated as follows:
1. Server node 110B (3 data blocks)
2. Server node 110A (2 data blocks)

The populating of time slot #3 through time slot #7 in network schedule 234B may proceed in a similar fashion. For brevity, a detailed discussion is omitted. Once the ordered list of receivers is completely exhausted, then the populating of server node 110C as a sending node is complete, and the next sender can be processed.

Third Sender

Referring back to the sender order of block 204, the next sender to be processed is server node 110B. For server node 110B as the sending node, the ordered list of receivers is as follows:
1. Server node 110C (3 data blocks)
2. Server node 110A (2 data blocks)
3. Server node 110D (2 data blocks)

The first candidate receiver in the ordered list, or server node 110C, is available to fill time slots #0, #1, and #2, as shown in network schedule 234C. Thus, the ordered list of receivers is updated as follows:
1. Server node 110A (2 data blocks)
2. Server node 110D (2 data blocks)

The first candidate receiver in the ordered list, or server node 110A, is available to fill time slots #3 and #4, as shown in network schedule 234C. Thus, the ordered list of receivers is updated as follows:
1. Server node 110D (2 data blocks)

The first candidate receiver in the ordered list, or server node 110D, is available to fill time slot #5, as shown in network schedule 234C. However, it can be seen that server node 110D is already specified for server node 110A in time slots #6, #7, and #8. Thus, these time slots are left empty for node 110B since there are no remaining candidates in the ordered list of receivers. Once time slot #9 is reached, the final data block for server node 110D can be specified, and the scheduling for server node 110B as a sender node is complete.

Fourth Sender

Referring back to the sender order of block 204, the next sender to be processed is server node 110D. For server node 110D as the sending node, the ordered list of receivers is as follows:
1. Server node 110A (2 data blocks)
2. Server node 110C (2 data blocks)
3. Server node 110B (1 data block)

For time slot #0 and time slot #1, no receiver can be specified since all of the possible receivers are already specified. Thus, time slot #0 and #1 are left empty. The first candidate receiver in the ordered list, or server node 110A, is available to fill time slot #2, as shown in network schedule 234D. Thus, the ordered list of receivers is updated and resorted as follows:
1. Server node 110C (2 data blocks)
2. Server node 110A (1 data block)
3. Server node 110B (1 data block)

For time slot #3, the ordered list is traversed until an available receiver is found at entry 3, or server node 110B, for example by checking a bitmask while traversing the ordered list. Thus, server node 110B is filled for time slot #3, as shown in network schedule 234D. Thus, the ordered list of receivers is updated as follows:
1. Server node 110C (2 data blocks)
2. Server node 110A (1 data block)

For time slot #4, no receiver can be specified since all of the possible receivers are already specified. Thus, time slot #4 is left empty. For time slot #5, the ordered list is traversed until an available receiver is found at entry 2, or server node 110A. Thus, the ordered list of receivers is updated as follows:
1. Server node 110C (2 data blocks)

For time slot #6, the only receiver left is server node 110C, which can be specified for time slot #6 and the next time slot #7. Thus, the ordered list of receivers is fully exhausted and the building of network schedule 234D is complete, corresponding to network schedule 134 from FIG. 1F.

Re-Partition According to the Network Schedule

At block 208 of process 200, referring to FIG. 1A and FIG. 1F, server node 110A causes server nodes 110A-110D to re-partition according to network schedule 134. For example, network schedule 134 may be distributed to each of server nodes 110A-110D, with server nodes 110A-110D time synchronized to send their respective data blocks over network 180 according to network schedule 134. After block 208, the re-partitioning is complete. In a database context, the workload for the next database operator in the execution plan may then begin.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
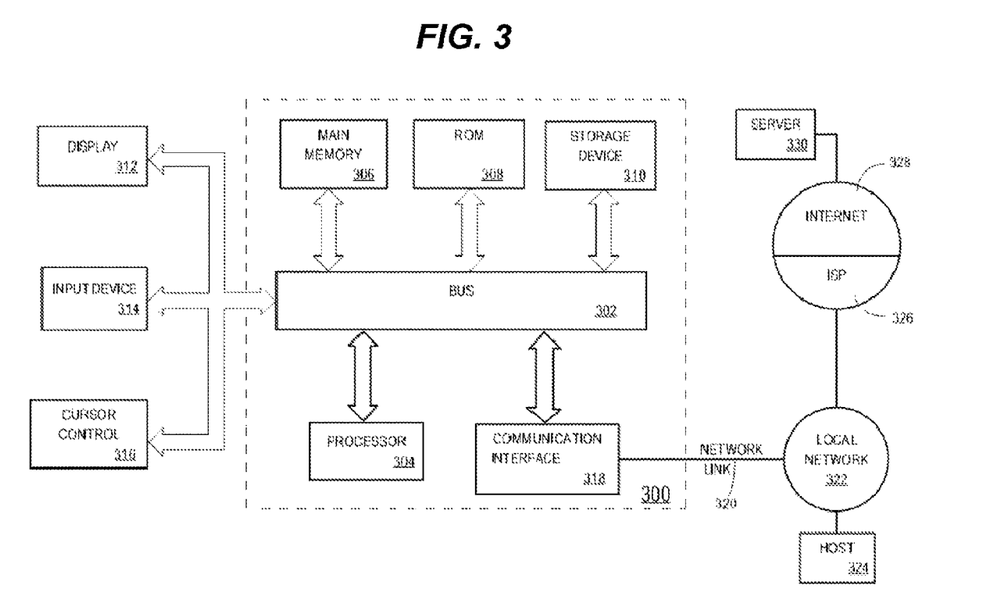
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving re-partitioning data describing, for each server node of a plurality of server nodes connected by a network, a quantity of data blocks to be sent to said each server node;
determining a sender order for the plurality of server nodes by using the re-partitioning data to sort, in descending order, the plurality of server nodes by a total quantity of data blocks to be sent;
according to the sender order, populating a network schedule comprising a plurality of time slots, wherein populating a network schedule includes for each time slot of the plurality of time slots;
assigning in the sender order at most one receiver node, of the plurality of server nodes to receive one or more data blocks over the network from a sender node of said plurality of server nodes, wherein assigning at most one receiver node is based at least on having a largest possible quantity of data blocks to be received by the sender node from any server node of said plurality of server nodes not yet assigned as a receiver node in said each time slot;
wherein each server node of said plurality of server nodes is assigned as a receiver node no more than once in said each time slot;
wherein the method is performed by one or more computing devices.

2. The method of claim 1, wherein for a particular time slot of said plurality of time slots and particular server node of said plurality of server nodes, assigning in the sender order at most one receiver node includes traversing an ordered list that includes other server nodes of said plurality of server nodes, wherein the ordered list is ordered in descending order of a quantity of data blocks to be received by the particular server node from each of the other server nodes of said plurality of server nodes.

3. The method of claim 2, wherein the traversing uses a bitmask that is maintained for said particular time slot to ensure that for said particular time slot a particular node of said plurality of server nodes is assigned as a receiver node no more than once in said particular time slot.

4. The method of claim 1, wherein for a particular time slot of said plurality of time slots, assigning in the sender order at most one receiver node is based on populating contiguous time slots with the at most one receiver node.

5. The method of claim 1, wherein the re-partitioning data is for transitioning from a first database operator on a first key to a second database operator on a second key.

6. The method of claim 1, wherein the one or more computing devices comprises a coordinator server.

7. The method of claim 1, wherein a size of each of the quantity of data blocks and a length of each of the plurality of time slots are based on the network.

8. A non-transitory computer-readable medium storing one or more sequences of instructions which, when executed by one or more processors, cause:
receiving re-partitioning data describing, for each server node of a plurality of server nodesconnected by a network, a quantity of data blocks to be sent to said each server node;
determining a sender order for the plurality of server nodes by using the re-partitioning data to sort, in descending order, the plurality of server nodes by a total quantity of data blocks to be sent;
according to the sender order, populating a network schedule comprising a plurality of time slots, wherein populating a network schedule includes for each time slot of the plurality of time slots,
assigning in the sender order at most one receiver node of the plurality of server nodes to receive one or more data blocks over the network from a sender node of said plurality of server nodes, wherein assigning at most one receiver node is based at least on having a largest possible quantity of data blocks to be received by the sender nodefrom any server node of said plurality of server nodes not yet assigned as a receiver node in said each time slot; and
wherein each server node of said plurality of server nodes is assigned as a receiver node no more than once in said each time slot.

9. The non-transitory computer-readable medium of claim 8, wherein for a particular time slot of said plurality of time slots and particular server node of said plurality of server nodes, assigning in the sender order at most one receiver node includes traversing an ordered list that includes other server nodes of said plurality of server nodes, wherein the ordered list is ordered in descending order of a quantity of data blocks to be received by the particular server node from each of the other server nodes of said plurality of server nodes.

10. The non-transitory computer-readable medium of claim 9, wherein the traversing uses a bitmask that is maintained for said particular time slot to ensure that for said particular time slot a particular node of said plurality of server nodes is assigned as a receiver node no more than once in said particular time slot.

11. The non-transitory computer-readable medium of claim 8, wherein for a particular time slot of said plurality of time slots, assigning in the sender order at most one receiver node is based on populating contiguous time slots with the at most one receiver node.

12. The non-transitory computer-readable medium of claim 8, wherein the re-partitioning data is for transitioning from a first database operator on a first key to a second database operator on a second key.

13. The non-transitory computer-readable medium of claim 8, wherein a size of each of the quantity of data blocks and a length of each of the plurality of time slots are based on the network.

14. A system comprising one or more computing devices configured to:
receive re-partitioning data describing, for each server node of a plurality of server nodes connected by a network, a quantity of data blocks to be sent to said each server node;
determine a sender order for the plurality of server nodes by using the re-partitioning data to sort, in descending order, the plurality of server nodes by a total quantity of data blocks to be sent;
according to the sender order, to populate a network schedule comprising a plurality of time slots, wherein to populate a network schedule said system is confugured to, for each time slot of the plurality of time slots:
to assign in the sender order at most one receiver node of the plurality of server nodes to receive one or more data blocks over the network from a sender node of said plurality of server nodes, wherein to assign at most one receiver node is based at least on having a largest possible quantity of data blocks to be received by the sender nodefrom any server node of said plurality of server nodes not yet assigned as a receiver node in said each time slot; and
wherein each server node of said plurality of server nodes is assigned as a receiver node no more than once in said each time slot.

15. The system of claim 14, said system is configured for a particular time slot of said plurality of time slots and particular server node of said plurality of server nodes, to assign in the sender order at most one receiver node by traversing an ordered list that includes other server nodes of said plurality of server nodes, wherein the ordered list being ordered in descending order of a quantity of data Hocks to be received by the particular server node from each of the other server nodes of said plurality of server nodes
for a particular time slot of said plurality of time slots, to assign in the sender order at most one receiver node by traversing an ordered list of said plurality of server nodes, wherein the ordered list is ordered in descending order of data blocks to be received by the particular server node from each of said plurality of server nodes.

16. The system of claim 15, wherein the system is configured to traverse using a bitmask that is maintained for said particular time slot to ensure that for said particular time slot a particular node of said plurality of server nodes is assigned as a receiver node no more than once in said particular time slot.

17. The system of claim 14, wherein for a particular time slot of said plurality of time slots, to assign in the sender order at most one receiver node is based on populating contiguous time slots with the at most one receiver node.

18. The system of claim 14, wherein the re-partitioning data is configured for transitioning from a first database operator on a first key to a second database operator on a second key.

19. The system of claim 14, wherein the one or more computing devices comprises a coordinator server.

20. The system of claim 14, wherein a size of each of the quantity of data blocks and a length of each of the plurality of time slots are based on the network.

* * * * *

UNITED STATES PATENT AND TRADEMARK OFFICE
CERTIFICATE OF CORRECTION

PATENT NO. : 9,813,490 B2  
APPLICATION NO. : 14/711617  
DATED : November 7, 2017  
INVENTOR(S) : Idicula et al.

Page 1 of 1

It is certified that error appears in the above-identified patent and that said Letters Patent is hereby corrected as shown below:

On page 2, Column 2, under Other Publications, Line 18, delete ""InfinBand" and insert -- "InfiniBand --, therefor.

In Column 2, Line 48, delete "O(T*N^4)" and insert -- O(N^4) --, therefor.

In Column 14, Line 46, in Claim 1, delete "slots;" and insert -- slots: --, therefor.

In Column 14, Line 47, in Claim 1, delete "node," and insert -- node --, therefor.

In Column 15, Line 25, in Claim 8, delete "nodesconnected" and insert -- nodes connected --, therefor.

In Column 15, Line 35, in Claim 8, delete "slots," and insert -- slots; --, therefor.

In Column 15, Line 42, in Claim 8, delete "nodefrom" and insert -- node from --, therefor.

In Column 16, Lines 24-25, in Claim 14, delete "confugured" and insert -- configured --, therefor.

In Column 16, Line 33, in Claim 14, delete "nodefrom" and insert -- node from --, therefor.

In Column 16, Line 45, in Claim 15, delete "Hocks" and insert -- blocks --, therefor.

Signed and Sealed this  
Tenth Day of July, 2018

Andrei Iancu  
*Director of the United States Patent and Trademark Office*